(12) United States Patent
Sherwood

(10) Patent No.: US 12,553,552 B1
(45) Date of Patent: Feb. 17, 2026

(54) CONDUIT COUPLER

(71) Applicant: Robert Sherwood, Almont, MI (US)

(72) Inventor: Robert Sherwood, Almont, MI (US)

( * ) Notice: Subject to any disclaimer, the term of this patent is extended or adjusted under 35 U.S.C. 154(b) by 0 days.

(21) Appl. No.: 18/804,502

(22) Filed: Aug. 14, 2024

(51) Int. Cl.
*F16L 25/00* (2006.01)

(52) U.S. Cl.
CPC .................. *F16L 25/0045* (2013.01)

(58) Field of Classification Search
CPC . F16L 25/0045; F16L 37/0847; F16L 37/098; F16L 37/3982; F16L 37/0985
See application file for complete search history.

(56) References Cited

U.S. PATENT DOCUMENTS

| | | | | |
|---|---|---|---|---|
| 4,923,227 | A * | 5/1990 | Petty | F16L 25/0045 285/903 |
| 5,356,181 | A * | 10/1994 | Shirogane | F16L 25/0045 285/308 |
| 7,478,840 | B2 * | 1/2009 | Youssefifar | F16L 25/0045 285/55 |
| 7,871,109 | B1 * | 1/2011 | McKinnon | F16L 37/098 285/903 |
| 2010/0219632 | A1 * | 9/2010 | Fieber | F16L 37/0985 285/371 |
| 2014/0284915 | A1 * | 9/2014 | Arnold | F16L 37/0982 285/82 |
| 2018/0017197 | A1 * | 1/2018 | Meister | F16L 37/0985 |
| 2019/0390808 | A1 * | 12/2019 | Trotter | F16L 37/0985 |
| 2021/0324983 | A1 * | 10/2021 | Krolik | F16L 25/0045 |

FOREIGN PATENT DOCUMENTS

| | | | | |
|---|---|---|---|---|
| DE | 3626403 | A1 * | 2/1988 | ......... F16L 25/0045 |
| DE | 4020171 | C1 * | 12/1991 | ......... F16L 25/0045 |
| DE | 102020106671 | A1 * | 9/2021 | ......... F16L 25/0045 |
| GB | 2459161 | A * | 10/2009 | ......... F16L 25/0045 |
| IT | 201800004151 | A1 * | 9/2019 | ......... F16L 25/0045 |
| WO | WO-2009038513 | A1 * | 3/2009 | ......... F16L 37/0985 |

* cited by examiner

*Primary Examiner* — Zachary T Dragicevich
*Assistant Examiner* — Fannie Kee
(74) *Attorney, Agent, or Firm* — Brooks Kushman P.C.

(57) ABSTRACT

A conduit coupler includes a first region, a second region, and a plurality of clips. The first region has a first peripheral wall defining a first cavity. The second region is secured to the first region and has a second peripheral wall defining a second cavity. The plurality of clips is secured to the second region and extends into to the second cavity from the second peripheral wall at angles relative to the second peripheral wall. The plurality of clips is operable to engage a corrugated conduit to secure the corrugated conduit to the second region within the second cavity.

20 Claims, 4 Drawing Sheets

CONDUIT COUPLER

TECHNICAL FIELD

The present disclosure relates to coupling devices that are operable to secure pipes or conduits to each other.

BACKGROUND

Intermediate devices may be operable secured two or more pipes or conduits to each other.

SUMMARY

A conduit coupler includes a first tube, a second tube, and a plurality of clips. The first tube has a first wall defining a first internal cavity. The first internal cavity is operable to receive a non-corrugated conduit. The second tube is secured to the first tube and has a second wall defining a second internal cavity. The second internal cavity is in fluid communication with the first internal cavity. The second internal cavity is operable to receive a corrugated conduit to establish fluid communication between the non-corrugated conduit and the corrugated conduit. The plurality of clips is secured to the second wall and extends into to the second internal cavity from the second wall at angles relative to the second wall. The plurality of clips includes first and second clips positioned at a first acute angle relative to each other along a periphery of the second wall. The plurality of clips also include third and fourth clips positioned at a second acute angle relative to each other along the periphery of the second wall. The third and fourth clips are also positioned at obtuse angles relative to the first and second clips along the periphery of the second wall. The plurality of clips is operable to engage the corrugated conduit to secure the corrugated conduit to the second tube within the second internal cavity.

A conduit coupler includes a first region, a second region, and a plurality of clips. The first region has a first peripheral wall defining a first cavity. The second region is secured to the first region and has a second peripheral wall defining a second cavity. The plurality of clips is secured to the second region and extends into to the second cavity from the second peripheral wall at angles relative to the second peripheral wall. The plurality of clips is operable to engage a corrugated conduit to secure the corrugated conduit to the second region within the second cavity.

A conduit coupler includes a first region, a second region, and a plurality of clips. The first region has a first wall defining a first cavity. The first cavity is operable to receive a conduit. The second region is secured to the first region and has a second wall defining a second cavity. The second cavity is in fluid communication with the first cavity. The second cavity is operable to receive a corrugated conduit to establish fluid communication between the conduit and the corrugated conduit. The plurality of clips is secured to the second region and extends into to the second cavity from the second wall. The plurality of clips includes first and second clips positioned at a first acute angle relative to each other along a periphery of the second wall. The plurality of clips include third and fourth clips positioned at a second acute angle relative to each other along the periphery of the second wall. The third and fourth clips are also positioned at obtuse angles relative to the first and second clips along the periphery of the second wall. The plurality of clips is operable to engage the corrugated conduit to secure the corrugated conduit to the second region within the second cavity.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
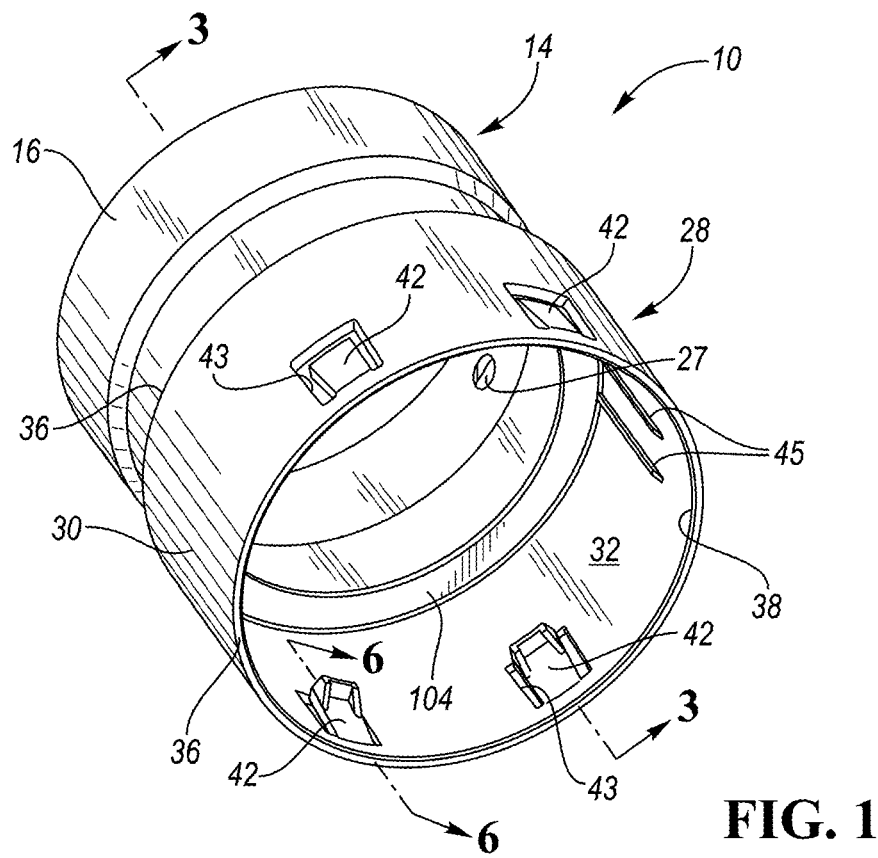
FIG. 1 is a perspective front view of a coupler that is operable to connect two or more conduits to each other.
Figure 2:
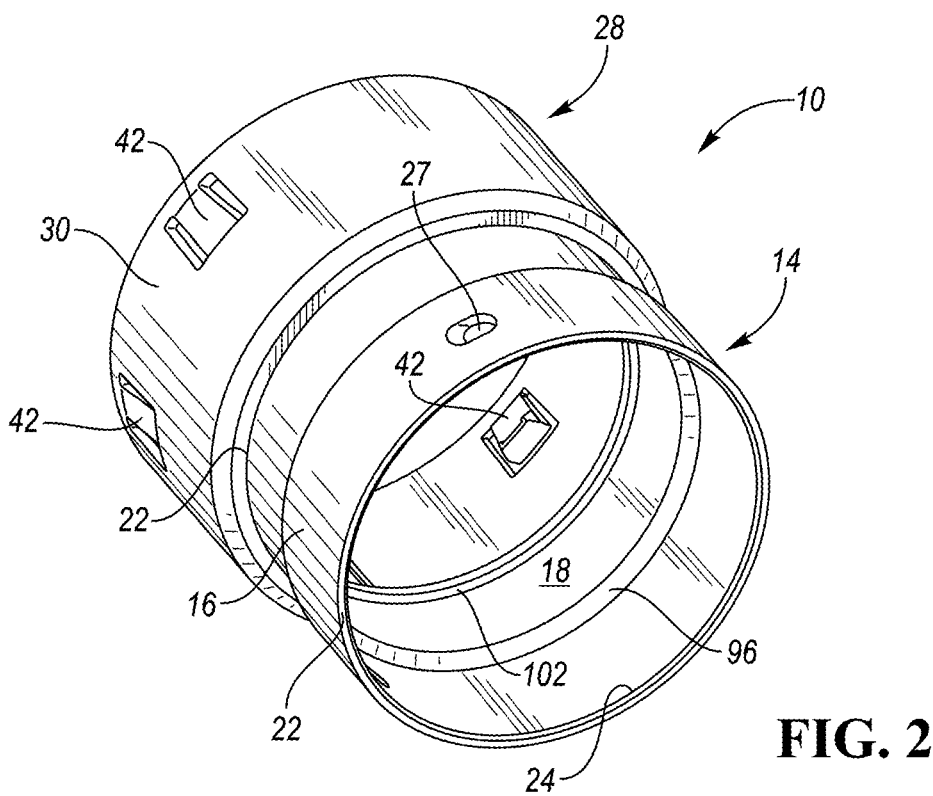
FIG. 2 is a perspective rear view of the coupler.
Figure 3:
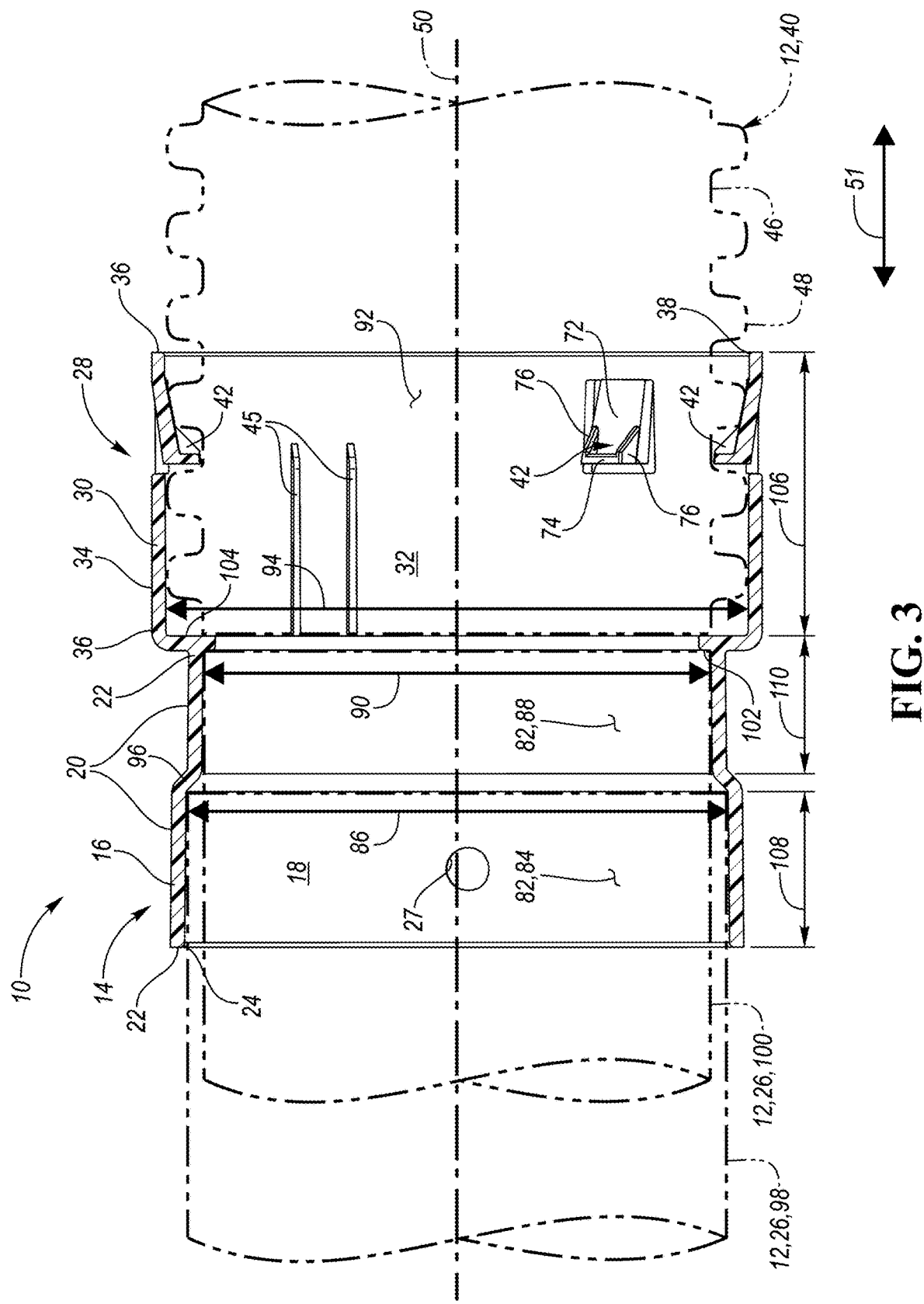
FIG. 3 is a cross-sectional view of the coupler taken along line 3-3 in FIG. 1.
Figure 4:
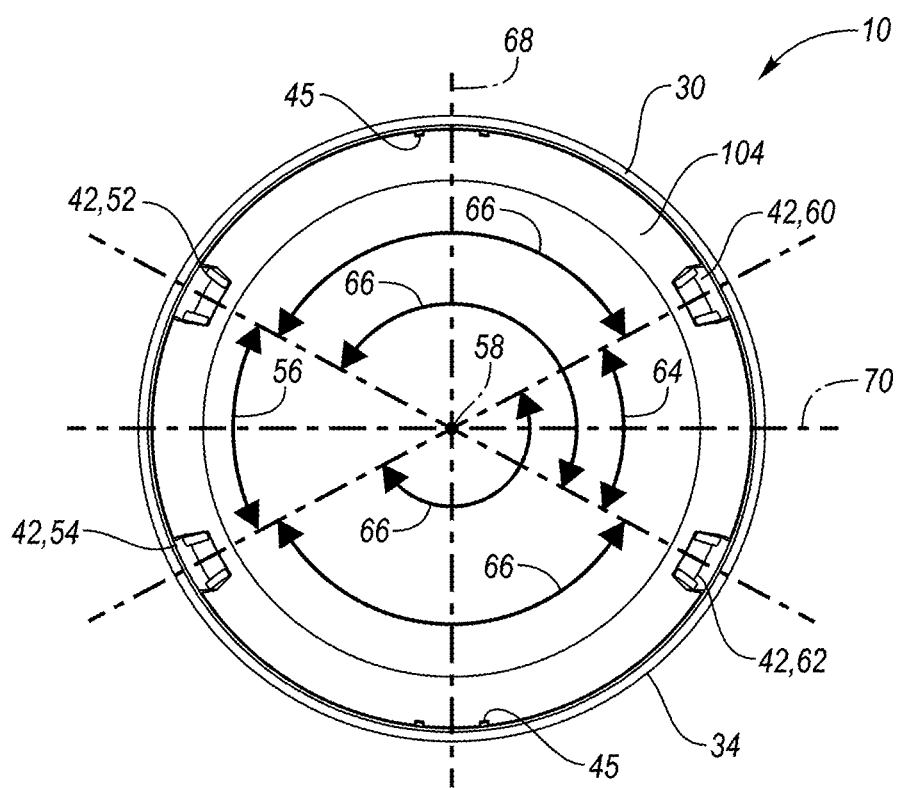
FIG. 4 is a front view of the coupler.
Figure 5:
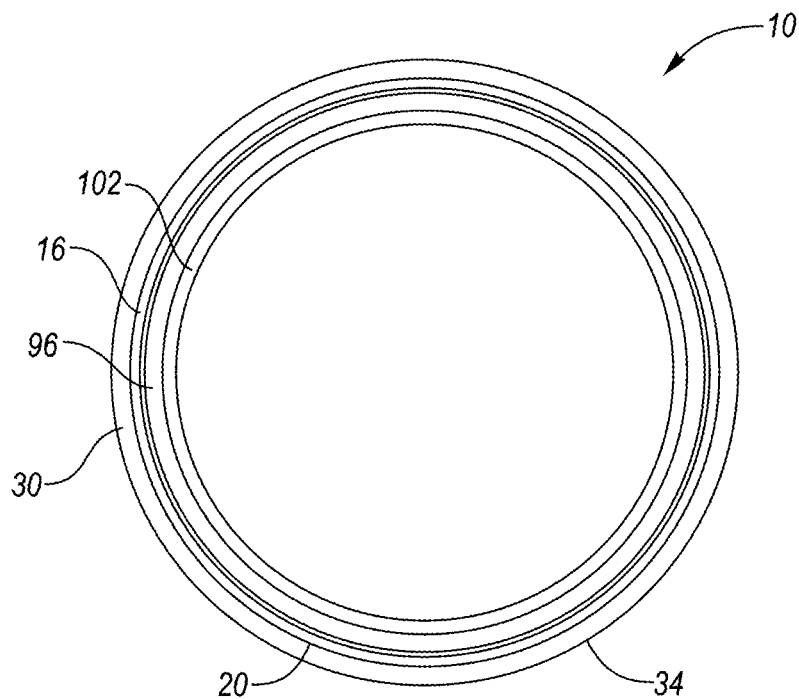
FIG. 5 is a rear view of the coupler.
Figure 6:
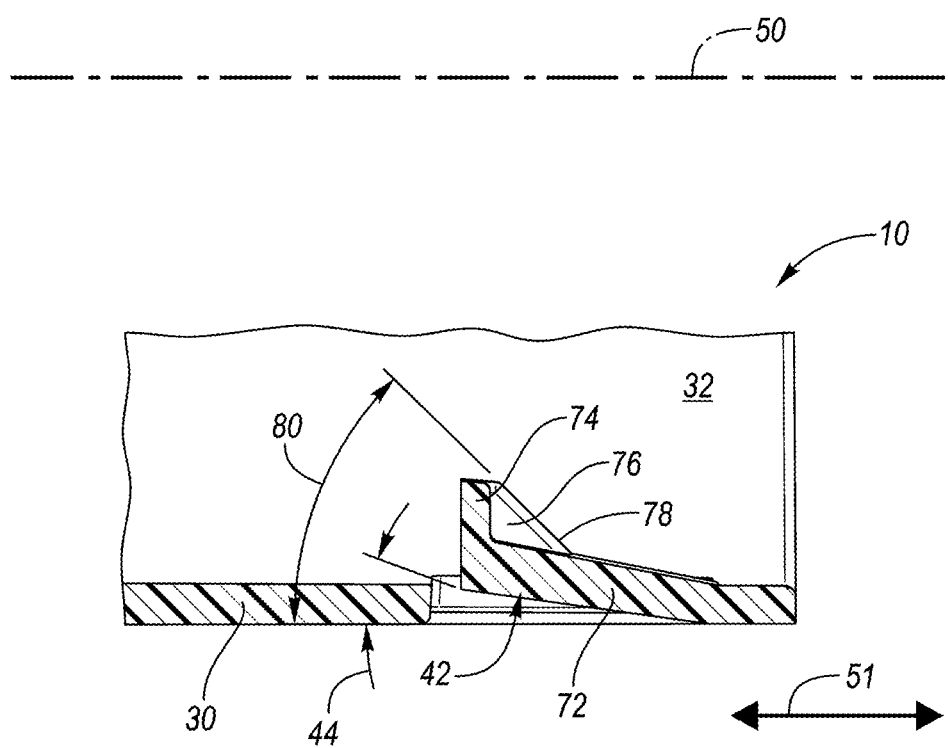
FIG. 6 is a partial cross-sectional view of the coupler taken along line 6-6 in FIG. 1.

Referring to FIGS. 1-6, a coupler 10 that is operable to connect two or more tubes, pipes, or conduits 12 to each other. The coupler 10 may also be configured to establish fluid communication between the two or more tubes, pipes, or conduits 12 that are each connected to the coupler 10.

The coupler 10 may include a first region 14 having a first wall 16 defining a first internal cavity 18. More specifically, the first region 14 may correspond to a first portion of the coupler 10 that forms a first tube, pipe, or conduit. The first wall 16 may extend about a periphery 20 of the first region 14. The periphery 20 may correspond to an outer radial periphery of the first region 14 and/or the first wall 16. The first wall 16 may extend radially about the first internal cavity 18 and axially between opposing ends 22 of the first region 14. Therefore, the first wall 16 may be referred to as the first peripheral wall. The first region 14 and the first internal cavity 18 may be round or circular in shape. Therefore, the first wall 16 may extend circumferentially around the first internal cavity 18.

The first region 14 may define an opening 24 to the first internal cavity 18 along one of the opposing ends 22. The opening 24 may also be disposed along an end of the coupler 10 as whole. The first internal cavity 18 may be operable to receive a non-corrugated tube, pipe, or conduit 26 via the opening 24. The first region 14, or more specifically, the first wall 16 may define orifices 27 operable to receive fasteners to (i) engage the coupler 10 within the orifices 27 and (ii) engage the non-corrugated conduit 26 to secured the coupler 10 and the non-corrugated conduit 26 to each other.

The coupler 10 may include a second region 28 that is secured to the first region 14. More specifically, the second region 28 may correspond to a second portion of the coupler 10 that forms a second tube, pipe, or conduit. The second region 28 may have a second wall 30 defining a second internal cavity 32. The second internal cavity 32 may be in fluid communication with the first internal cavity 18. The second wall 30 may extend about a periphery 34 of the second region 28. The periphery 34 may correspond to an outer radial periphery of the second region 28 and/or the second wall 30. The second wall 30 may extend radially about the second internal cavity 32 and axially between opposing ends 36 of the second region 28. Therefore, the second wall 30 may be referred to as the second peripheral wall. The second region 28 and the second internal cavity 32 may be round or circular in shape. Therefore, the second wall 30 may extend circumferentially around the second internal cavity 32.

The second region 28 may define an opening 38 to the second internal cavity 32 along one of the opposing ends 36. The opening 38 may also be disposed along an end of the coupler 10 as whole, and on an opposite end of the coupler 10 relative to opening 24. Furthermore, the first internal cavity 18 and the second internal cavity 32 may form a single larger internal cavity that extends between opening 24 and opening 38.

The second internal cavity 32 may be operable to receive a corrugated tube, pipe, or conduit 40 via the opening 38 to establish fluid communication between the non-corrugated conduit 26 and the corrugated conduit 40. More specifically, the fluid communication between the first internal cavity 18 and the second internal cavity 32 (or the single larger internal cavity that includes both the first internal cavity 18 and the second internal cavity 32) may be operable to establish fluid communication between the non-corrugated conduit 26 and the corrugated conduit 40 once the non-corrugated conduit 26 and the corrugated conduit 40 are each connected to the coupler 10.

The coupler 10 also includes a plurality of clips. Each clip 42 of the plurality of clips is secured to the second region 28, or more specifically to the second wall 30. More specifically, the second wall 30 may defined openings or cutouts 43 and each clip 42 may be secured to the second wall 30 within one of the cutouts 43. The clips 42 are operable to engage the corrugated conduit 40 to secure the corrugated conduit 40 to the second region 28 within the second internal cavity 32. More specifically, the clips 42 are operable to engage the corrugated conduit 40 within valleys 46 defined between ribs 48 of the corrugated conduit 40 to secure the corrugated conduit to the second region 28 within the second internal cavity 32. The coupler 10 may also include ribs 45 that extend into the second internal cavity 32. The ribs 45 may be operable to center the corrugated conduit 40 in the second internal cavity 32. The ribs 45 may also be operable to engage the corrugated conduit 40 to further secure the corrugated conduit 40 to the second region 28 within the second internal cavity 32.

The clips 42 extend into to the second internal cavity 32 from the second wall 30 at first angles 44 relative to the second wall 30. The first angles 44 may also be oriented axially relative to the coupler 10 or relative to a central axis 50 of the coupler 10, where the central axis 50 extends between the opposing ends of the coupler 10 (e.g., between opening 24 and opening 38). The central axis 50 may also extend along a direction of flow 51 of a fluid through the coupler 10. The first angles 44 between the clips 42 and the second wall 30 may range between 5° and 15°.

The central axis 50 may also be substantially perpendicular to opening 24 and to opening 38. As used herein, substantially perpendicular refers to any incremental angle that is between exactly perpendicular and 15° or less from exactly perpendicular (e.g., 12.5° or less from exactly perpendicular, 10° or less from exactly perpendicular, 5° or less from exactly perpendicular, 1° or less from exactly perpendicular, 0.5° or less from exactly perpendicular, 0.1° or less from exactly perpendicular, etc.).

The clips 42 may include a first set of clips that includes a first clip 52 and a second clip 54. The first clip 52 and the second clip 54 are positioned at a first acute angle 56 relative to each other along the periphery 34 of the second wall 30. The first acute angle 56 may also be measured from a center point 58 of the coupler 10 to a center of the clips 42, and may be oriented substantially perpendicular to the central axis 50 and to the direction of flow 51 of a fluid through the coupler 10. The first acute angle 56 may range between 45° and 65°.

The clips 42 may also include a second set of clips that includes a third clip 60 and a fourth clip 62. The third clip 60 and the fourth clip 62 are positioned at a second acute angle 64 relative to each other along the periphery 34 of the second wall 30. The second acute angle 64 may also be measured from the center point 58 of the coupler 10 to a center of the clips 42, and may be oriented substantially perpendicular to the central axis 50 and to the direction of flow 51 of a fluid through the coupler 10. The second acute angle 64 may range between 45° and 65°.

The third clip 60 and the fourth clip 62 may also be positioned at obtuse angles 66 relative to the first clip 52 and the second clip 54 along the periphery 34 of the second wall 30. The obtuse angles 66 may also be measured from the center point 58 of the coupler 10 to a center of the clips 42, and may be oriented substantially perpendicular to the central axis 50 and to the direction of flow 51 of a fluid through the coupler 10. The obtuse angles 66 may range between 115° and 180°, including 180°. More specifically, the obtuse angle 66 between the first clip 52 and the third clip 60 may be less than 180°, the obtuse angle 66 between the first clip 52 and the fourth clip 62 may be substantially 180°, the obtuse angle 66 between the second clip 54 and the fourth clip 62 may be less than 180°, the obtuse angle 66 between the second clip 54 and the third clip 60 may be substantially 180°.

As used herein, substantially 180° refers to any incremental angle that is between exactly 180° and 15° or less from exactly 180° (e.g., 12.5° or less from exactly 180°, 10° or less from exactly 180°, 5° or less from exactly 180°, 1° or less from exactly 180°, 0.5° or less from exactly 180°, 0.1° or less from exactly 180°, etc.).

The orientation of the various clips 42 at the first acute angle 56, second acute angle 64, and obtuse angles 66 ensures that that clips 42 are not spaced equidistantly around the periphery 34 of the second wall 30. This facilitates a more robust connection between the coupler 10 and the corrugated conduit 40, which operates to prevent the coupler 10 and the corrugated conduit 40 from walking apart or rocking apart when compared to a configuration where the clips are spaced equidistantly around the periphery 34 of the second wall 30.

It is also noted that the first set of clips (i.e., the first clip 52 and the second clip 54) may be position on an opposite side of the periphery 34 of the second wall 30 relative to the second set of clips (i.e., the third clip 60 and the fourth clip 62) such that first set of clips is the mirror image of the second set of clips along the periphery 34 of the second wall 30 when the periphery 34 of the second wall 30 is divided into two equal halves along a first line 68 that intersects the center point 58. The first clip 52 and the third clip 60 may be position on an opposite side of the periphery 34 of the second wall 30 relative to the second clip 54 and the fourth clip 62 such that the combination of the first clip 52 and the third clip 60 is the mirror image of the combination of the second clip 54 and the fourth clip 62 along the periphery 34 of the second wall 30 when the periphery 34 of the second wall 30 is divided into two equal halves along a second line 70 that intersects the center point 58. The first line 68 may be substantially perpendicular to the second line 70. The first line 68 and the second line 70 may each be substantially perpendicular to the central axis 50 and the direction of flow 51 of a fluid through the coupler 10.

The clips 42 each include biasing elements 72 extending into to the second internal cavity 32 from the second wall 30 at the first angles 44 relative to the second wall 30. The clips also each include barbs 74 disposed along opposing ends of the biasing elements 72 relative to the second wall 30. The barbs 74 may be substantially perpendicular to the second wall 30. Each of the clips 42 may also include reinforcement ribs 76 extending between the biasing elements 72 and the barbs 74. The reinforcement ribs 76 may be triangular in shape and may be secured to lateral sides, lateral ends, or lateral edges of both the biasing elements 72 and barbs 74. The reinforcement ribs 76 are operable to increase the rigidity or structural integrity between the biasing elements 72 and the barbs 74 (e.g., the reinforcement ribs 76 operate to reduce relative movement between the biasing elements 72 and the barbs 74). However, the biasing elements 72 and barbs 74 are collectively operable to flex radially outward during installation of the corrugated conduit 40 into the coupler 10, and to snap or spring back such that the barbs 74 are disposed within one of the valleys 46 to retain the corrugated conduit 40 to the coupler 10 within the second internal cavity 32).

Outer edges 78 of the reinforcement ribs 76 (e.g., outer edges of the reinforcement ribs 76 that are not directly connected to either a biasing element 72 or a barb 74) are oriented within the second internal cavity 32 at second angles 80 relative to the second wall 30. The second angles 80 may also be oriented axially relative to the coupler 10, relative to the central axis 50 of the coupler 10, or relative to the direction of flow 51 of a fluid through the coupler 10. The second angles 80 between the clips 42 and the second wall 30 may range between 35° and 55°.

An internal surface 82 of the first wall 16 has a first subregion 84 having a first inner diameter 86 and a second subregion 88 having a second inner diameter 90 that is less than the first inner diameter 86. An internal surface 92 of the second wall 30 has a third inner diameter 94 that may be greater than both the first inner diameter 86 and the second inner diameter 90. A step 96 is disposed between the first subregion 84 and the second subregion 88. The first subregion 84 is operable to engage a thick wall non-corrugated conduit 98. The second subregion 88 is operable to engage a thin wall non-corrugated conduit 100. The step 96 is operable to restrict the thick wall non-corrugated conduit 98 from extending into the second subregion 88 (e.g., the step 96 operates as a stop to prevent the thick wall non-corrugated conduit 98 from extending into the second subregion 88). Stated in other terms the first subregion 84 is operable to receive a conduit having a larger outer diameter relative to a conduit that may be received into the second subregion 88. The outer periphery 20 of the first region 14 or first wall 16 may also include the step 96. The step 96 may be angled relative to the first wall 16 as illustrated to facilitate insertion of the thin wall non-corrugated conduit 100. Alternatively, the step 96 could be substantially perpendicular to the first wall 16.

A first stopping surface 102 may be disposed along an axial end of the first region 14, within the first internal cavity 18, and at the boundary between the first region 14 and the second region 28 (which may also be the boundary between the first internal cavity 18 and the second internal cavity 32). The first stopping surface 102 may be operable to engage the thin wall non-corrugated conduit 100 to prevent the thin wall non-corrugated conduit 100 from extending into the second region 28 and the second internal cavity 32. A second stopping surface 104 may be disposed along an axial end of the second region 28, within the second internal cavity 32, and at the boundary between the first region 14 and the second region 28 (which may also be the boundary between the first internal cavity 18 and the second internal cavity 32). The second stopping surface 104 may be operable to engage the corrugated conduit 40 to prevent the corrugated conduit 40 from extending into the first region 14 and the first internal cavity 18.

The second region 28 may include a first axial dimension 106. The first subregion 84 may have a second axial dimension 108. The second subregion 88 may have a third axial dimension 110. The first axial dimension 106, the second axial dimension 108, and the third axial dimension 110 may be lengths along the central axis 50 and the direction of flow 51. The first axial dimension 106 may be greater than the second axial dimension 108 and the third axial dimension 110.

The coupler may be made from any desirable material such as a metal (e.g., steel, aluminum, magnesium, titanium, or any other metal), plastic, stone, stoneware, ceramics, or composites, etc. However, the coupler 10 may preferable be made from a plastic material, such a thermoplastic, thermoset plastic, or polymer. More specifically, the coupler may be made from Polyvinyl Chloride (PVC), Polyethylene (PE), Polypropylene (PP), Acrylonitrile Butadiene Styrene (ABS), Polycarbonate (PC), Polyethylene Terephthalate (PET), Chlorinated Polyvinyl Chloride (CPVC), Polyurethane (PU), Polystyrene (PS), Polyvinylidene Chloride (PVDC), Ethylene Vinyl Acetate (EVA).

It should be understood that the designations of first, second, third, fourth, etc. for any component, state, or condition described herein may be rearranged in the claims so that they are in chronological order with respect to the claims. Furthermore, it should be understood that any component, state, or condition described herein that does not have a numerical designation may be given a designation of first, second, third, fourth, etc. in the claims if one or more of the specific component, state, or condition are claimed.

The words used in the specification are words of description rather than limitation, and it is understood that various changes may be made without departing from the spirit and scope of the disclosure. As previously described, the features of various embodiments may be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. As such, embodiments described as less desirable than other embodiments or prior art implementations with respect to one or more characteristics are not outside the scope of the disclosure and may be desirable for particular applications.

What is claimed is:

1. A conduit coupler comprising:
a first tube having a first wall defining a first internal cavity, wherein the first internal cavity is operable to receive a non-corrugated conduit;
a second tube (i) secured to the first tube and (ii) having a second wall defining a second internal cavity, wherein the second internal cavity is (a) in fluid communication with the first internal cavity and (b) operable to receive a corrugated conduit to establish fluid communication between the non-corrugated conduit and the corrugated conduit; and
a plurality of clips (i) secured to the second wall, (ii) extending into the second internal cavity from the second wall at first angles relative to the second wall, (iii) including first and second clips positioned at a first acute angle relative to each other along a periphery of the second wall, and (iv) including third and fourth clips positioned at (a) a second acute angle relative to each other along the periphery of the second wall and (b) obtuse angles relative to the first and second clips along the periphery of the second wall, wherein the plurality of clips is operable to engage the corrugated conduit to secure the corrugated conduit to the second tube within the second internal cavity, wherein the plurality of clips include biasing elements extending into the second internal cavity from the second wall at the first angles relative to the second wall, barbs disposed along opposing ends of the biasing elements relative to the second wall, and reinforcement ribs extending between the biasing elements and the barbs, wherein outer edges of the reinforcement ribs are oriented within the second internal cavity at second angles relative to the second wall.

2. The conduit coupler of claim 1, wherein the first angles range between 5° and 15°.

3. The conduit coupler of claim 1, wherein the first acute angle and the second acute angle range between 45° and 65°.

4. The conduit coupler of claim 1, wherein the obtuse angles range between 115° and 180°.

5. The conduit coupler of claim 1, wherein the barbs are substantially perpendicular to the second wall.

6. The conduit coupler of claim 1, wherein the second angles range between 35° and 53°.

7. The conduit coupler of claim 1, wherein an internal surface of the first wall (i) has a first region having a first inner diameter, (ii) a second region having a second inner diameter that is less than the first inner diameter, and (iii) a step disposed between the first region and the second region, wherein (a) the first region is operable to engage a thick wall non-corrugated conduit, (b) the second region is operable to engage a thin wall non-corrugated conduit, and (c) the step is operable to restrict the thick wall non-corrugated conduit from extending into the second region.

8. A conduit coupler comprising:
a first region having a first peripheral wall defining a first cavity:
a second region (i) secured to the first region and (ii) having a second peripheral wall defining a second cavity; and
a plurality of clips (i) secured to the second region and (ii) extending into the second cavity from the second peripheral wall at first angles relative to the second peripheral wall, wherein the plurality of clips is operable to engage a corrugated conduit to secure the corrugated conduit to the second region within the second cavity, wherein the plurality of clips include biasing elements extending into the second cavity from the second peripheral wall at the first angles relative to the second peripheral wall, barbs disposed along opposing ends of the biasing elements relative to the second peripheral wall, and reinforcement ribs extending between the biasing elements and barbs, and wherein outer edges of the reinforcement ribs are oriented within the second cavity at second angles relative to the second peripheral wall.

9. The conduit coupler of claim 8, wherein the first angles range between 5° and 15°.

10. The conduit coupler of claim 8, wherein the barbs are substantially perpendicular to the second peripheral wall.

11. The conduit coupler of claim 8, wherein the second angles range between 35° and 55°.

12. The conduit coupler of claim 8, wherein the plurality of clips include first and second clips positioned at a first acute angle relative to each other along the second peripheral wall.

13. The conduit coupler of claim 12, wherein the plurality of clips include third and fourth clips positioned at a second acute angle relative to each other along the second peripheral wall.

14. The conduit coupler of claim 13, wherein the third clip is positioned at a first obtuse angle relative to the first clip along the second peripheral wall.

15. The conduit coupler of claim 14, wherein the third clip is positioned at substantially 180° from the second clip along the second peripheral wall.

16. A conduit coupler comprising:
a first region having a first wall defining a first cavity, wherein the first cavity is operable to receive a conduit;
a second region (i) secured to the first region and (ii) having a second wall defining a second cavity, wherein the second cavity is (a) in fluid communication with the first cavity and (b) operable to receive a corrugated conduit to establish fluid communication between the conduit and the corrugated conduit; and
a plurality of clips (i) secured to the second region and (ii) extending into the second cavity from the second wall, (iii) including first and second clips positioned at a first acute angle relative to each other along a periphery of the second wall, and (iv) including third and fourth clips positioned at (a) a second acute angle relative to each other along the periphery of the second wall and (b) obtuse angles relative to the first and second clips along the periphery of the second wall, wherein the plurality of clips is operable to engage the corrugated conduit to secure the corrugated conduit to the second region within the second cavity, wherein the plurality of clips include biasing elements extending into the second cavity from the second wall at first angles relative to the second wall, barbs disposed along opposing ends of the biasing elements relative to the second wall, and reinforcement ribs extending between the biasing elements and the barbs, wherein outer edges of the reinforcement ribs are oriented within the second internal cavity at second angles relative to the second wall.

17. The conduit coupler of claim 16, wherein the first acute angle and the second acute angle range between 45° and 65°.

18. The conduit coupler of claim 16, wherein the obtuse angles range between 115° and 180°.

19. The conduit coupler of claim 16, wherein the first angles range between 5° and 15°.

20. The conduit coupler of claim 16, wherein the second angles range between 35° and 55°.

\* \* \* \* \*